March 17, 1931. L. SAMPLE 1,796,401
MEANS FOR JOINING TOGETHER PARTS OF FUSED QUARTZ, SILICA, OR THE LIKE
Filed Jan. 8, 1929
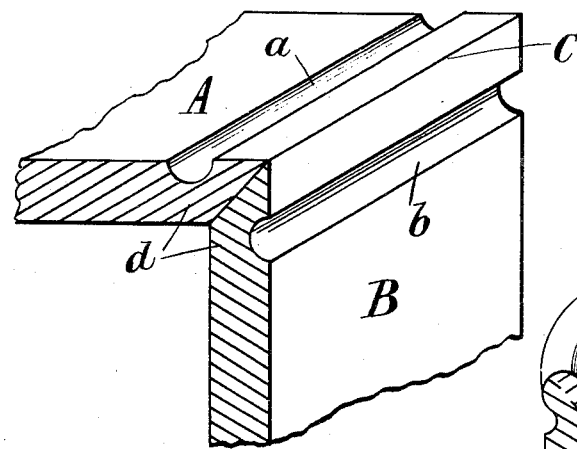
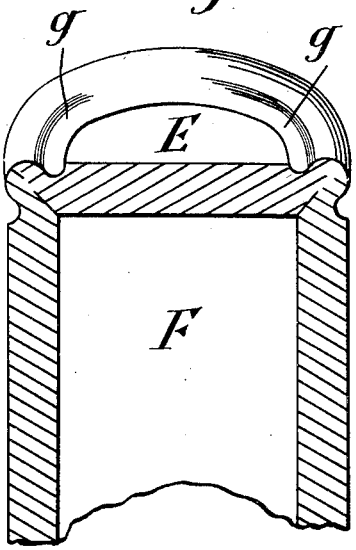
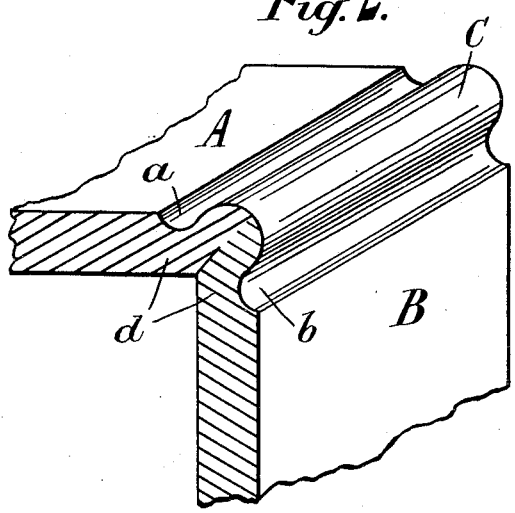

Patented Mar. 17, 1931

1,796,401

UNITED STATES PATENT OFFICE

LESLIE SAMPLE, OF BENTON, ENGLAND, ASSIGNOR TO THERMAL SYNDICATE LIMITED, OF WALLSEND-ON-TYNE, ENGLAND

MEANS FOR JOINING TOGETHER PARTS OF FUSED QUARTZ, SILICA, OR THE LIKE

Application filed January 8, 1929, Serial No. 331,146, and in Great Britain April 10, 1928.

This invention relates to joining together parts of fused quartz, silica, or the like, particularly when it is desired that the shape of one or several of the parts should be distorted as little as possible and to the resulting product.

When it is desired, for example, to join flat plates or discs of fused quartz on to the ends of silica tubes, the said plates or discs having been already ground flat and polished to present an optical surface, special precautions have to be taken during the operation of fusing these discs to the tubes to prevent distorting the optically worked surface due to heat and also to avoid as much as possible the possibility of introducing strain in the material and in the joint itself between the plate and the tube.

With regard to the introduction of strain during the making of the joint and after the joint is completed this becomes more important as the thickness of the plates and the wall thickness of the tubes to which the plate is fused is greater.

One method of making these joints which has been practised in the past is to grind a bevel on the edge of the inside or outside face of the plate or disc so as to form a knife edge at the point where the disc will make contact with the end of the tube to which it will be joined; also the wall of the tube may be bevelled to a knife edge so that when the plate is placed in position on the end of the tube the sharp edge of the plate abuts against the sharp end of the tube and presents a thin surface for fusing together and as the thin edge is readily melted the heat can be applied quickly thereby reducing the amount of strain in the optically worked plate. In certain cases the ends of the tube are flared and suitably ground to form a bevel.

Even when a plate is jointed to a tube by this method a certain amount of distortion does take place and this is due to excessive heating of the plate during the action of fusing the joint; also, the optical surface of the plate may be further damaged by a deposit of volatilized silica which appears as a result of melting the quartz at the joint. The same difficulties occur, of course, when it is desired to fuse together parts other than a plate to a tube.

According to the present invention a groove is cut following the line of fusion in one, or both, of the parts it is desired to fuse together and the parts are placed together and fused at the portion between the grooves.

The accompanying drawing shows how this may be carried out in practice. In Figure 1 is shown two parts A and B it is desired to fuse together. Each part is provided with a groove $a$ and $b$ respectively. The two parts are held together at their bevelled edges thus presenting a common line of fusion C along which a small oxy-hydrogen flame may be played in the usual way. When this is done, owing to the reduction in the thickness of the material at $d$ the rate of heat transfer from the point of fusion to the mass of the parts A and B is considerably reduced and therefore more time can be given to the fusing operation before the risk of distorting the parts arises than would be the case if the grooves $a$ and $b$ were not present. Further, the break in the surface of the parts caused by the grooves considerably reduces the amount of volatilized silica which travels along to the main surface of the parts and becomes deposited thereon. The shape of the joint after fusion is shown in Figure 2. Figure 3 shows the invention applied to the fusing of a plate, E, to a tube F. Grooves $g$ are cut preferably in both the plate and the tube which are also preferably provided with bevelled edges as hereinbefore described.

The invention may also be usefully applied, for example when it is desired to construct a rectangular or other shaped box or cell made up of flat or curved plates of fused quartz or the like in which one or several of the parts are to be distorted as little as possible. In this case before the cell or box is made up a groove is cut round the edges of all the plates or discs which will be used to make up the cell or box.

I have used the term "silica" in the accompanying claims broadly and without intention to limit the claims to so-called fused silica, that is, sand, as distinguished, for example, from fused quartz, that is, rock crystal.

Having now particularly described and ascertained the nature of my said invention and in what manner the same is to be performed, I declare that what I claim is:—

1. The process of joining together parts of silica which comprises forming a groove in at least one of the parts which it is desired to fuse together and following the line of fusion, placing the parts together, and fusing together portions of said parts adjacent to said groove but separated by said groove from another portion of one of the parts which is to be protected against distortion from the heat required for fusion.

2. Process as defined in claim 1, in which a plate is joined to the end of a tube, the edges of the tube and the plate being beveled to complementary angles and said parts being grooved and fused substantially as defined in claim 1.

3. Silica ware comprising separate parts fused together along a common face, at least one of said parts having a groove following adjacent the line of fusion and intervening between the fused joint and a portion of said part which is protected by the groove.

In testimony whereof I have signed my name to this specification.

LESLIE SAMPLE.